United States Patent
Gerber et al.

(10) Patent No.: US 6,692,352 B2
(45) Date of Patent: Feb. 17, 2004

(54) GRAIN STORAGE TANK COVERS

(75) Inventors: Edwin Milton Gerber, Hooppole, IL (US); Russell Andrew Huesmann, Jr., Bettendorf, IA (US); Chad Allen Dow, East Moline, IL (US); Mark Charles DePoorter, East Moline, IL (US); Garrick William Herbst, Bettendorf, IA (US); Lawrence Paul Begyn, Bettendorf, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/999,690

(22) Filed: Oct. 24, 2001

(65) Prior Publication Data

US 2003/0078085 A1 Apr. 24, 2003

(51) Int. Cl.$^7$ ................................................ A01F 12/60
(52) U.S. Cl. .......................................... 460/119; 460/23
(58) Field of Search ........................... 460/119, 23, 114, 460/901, 903; 414/293; 56/28; 296/15, 26.07

(56) References Cited

U.S. PATENT DOCUMENTS

| | | | | |
|---|---|---|---|---|
| 4,106,649 A | * | 8/1978 | Nelson et al. | 414/505 |
| 4,466,549 A | * | 8/1984 | Hanaway | 220/4.03 |
| 4,544,196 A | * | 10/1985 | Schmeichel et al. | 296/26.07 |
| 4,960,300 A | * | 10/1990 | Burvee | 296/34 |
| 5,151,064 A | * | 9/1992 | Damman et al. | 460/23 |
| 5,427,572 A | * | 6/1995 | Deutsch et al. | 460/119 |
| 6,082,570 A | * | 7/2000 | Tai | 220/6 |
| 6,206,779 B1 | * | 3/2001 | Gerber et al. | 460/23 |
| 6,508,705 B1 | * | 1/2003 | Van Overschelde | 460/23 |

FOREIGN PATENT DOCUMENTS

| | | | | |
|---|---|---|---|---|
| DE | 28 34 729 | | 7/1980 | .......... A01D/41/12 |
| DE | 40 08 147 | | 9/1990 | ............ B65D/6/22 |
| DE | 40 16 319 | | 11/1991 | .......... A01D/41/12 |
| DE | 41 20 731 | | 12/1992 | .......... A01D/41/12 |
| DE | 43 33 558 | | 1/1995 | .......... A01D/41/12 |
| DE | 44 45 933 | | 6/1996 | .......... A01D/41/42 |
| DE | 298 03 468 | | 6/1998 | .......... A01D/75/02 |
| EP | 98327 A1 | * | 1/1984 | .......... A01D/41/12 |
| EP | 0 627 159 | | 7/1994 | .......... A01D/41/12 |
| EP | 1201112 A1 | * | 5/2002 | .......... A01D/41/12 |
| GB | 2296175 A | * | 6/1996 | .......... A01D/41/12 |

OTHER PUBLICATIONS

Der Neue John Deere, CTS–Mahdrescher, Nov. 1998, 16 sheets.
Hopper Topper, Burt Moore Sales, Inc., date unknown, 4 sheets.
John Deere Serie 2200, Mahdrescher, Sep. 1998, 32 sheets.
Lexion, Claas, Neu Die total andere Klasse, Aug. 1996, 26 sheets.
John Deere Qualitat und Zuverlassigkeit in der Kompaktklasse, Mahdrescher 1170, Oct. 1997, 8 sheets.

* cited by examiner

*Primary Examiner*—Árpád Fábián Kovács
(74) *Attorney, Agent, or Firm*—Wilhelm Law Service; Thomas D. Wilhelm

(57) ABSTRACT

Rigid cover panels of the cover for grain storage tubes on combines, harvesting machine, are preferably fabricated of double-wall plastic to limit weight of the cover while providing desired strength and rigidity. The rigid cover panels can be pivoted about top edges of an underlying grain tank whereby the cover panels function as a height extension of the underlying tank, thus to increase the grain-carrying capacity of the tank. Flexible transition panels are preferably mounted to the rigid cover panels to bridge spaces between edge regions of the rigid cover panels when the rigid cover panels are raised to their upright, tank-extending orientations. A preferably single underlying actuator in the tank, in combination with mechanical linkages, can simultaneously raise all the rigid cover panels, all the flexible transition panels, and the discharge end of a clean grain elevator which discharges grain into the tank.

35 Claims, 4 Drawing Sheets

GRAIN STORAGE TANK COVERS

BACKGROUND

This invention relates to grain storage tanks on agricultural harvesting machines such as combines. More particularly, the invention relates to covers for such grain storage tanks. Such cover is used to close off a top opening of the grain storage tank, thus to shield grain, carried in the tank, from adverse weather conditions. Such cover is also used to protect the tank from e.g. tree branches which might otherwise drop into the tank through the top opening in the tank.

It is common for a conventional combine or other harvester to include a large capacity grain storage tank of e.g. about 100 bushels or more, for receiving and temporarily storing the grain or other harvested crop until such time as the harvested crop material can be unloaded from the harvester into an e.g. truck, wagon, or other vehicle which is used to carry the crop away from the field where the crop was grown, such as for permanent storage on the farm, or to an off-farm purchaser.

Hereinafter, the harvested crop will be referred to as grain. It will be understood that other crop materials can be harvested using such machines, and that all such other crop materials are thus intended to be included in such recitation of grain.

Also hereinafter, the harvester will be referred to as a combine, it being understood that the invention applies to other harvesting machines which include thereon tanks for temporary storage of the harvested crop.

Typically, such grain-receiving tank on the combine includes a plurality of underlying walls which define the tank as a receptacle. The underlying walls define a top opening of the tank. The top opening provides ready access to the interior of the tank from the top of the tank. The top opening also provides a visual inspection access for inspecting the condition and quality of the grain being carried in the tank. Further, the top opening enables the operator of the combine to have a top view of the upper portion of the tank from the operator's station in the cab, thus to see the grain in the tank as the grain begins to extend above the top opening in a nearly full tank, whereby the operator can ensure emptying the tank before the tank is over-filled. Further, the top opening provides an exit path for exhaust from the tank of dust which can be carried into the tank with the harvested grain.

It is common practice to equip the grain storage tank with one or more cover members, thus to overlie and close the top opening of the tank when desired, for example to keep out rain, dirt, and other foreign material. Such cover members, in the open orientation, provide access to the top opening of the underlying tank. Cover members also can serve, in the closed orientation, to close off the top opening of the tank, thus to prevent access to the tank through the top opening. Such closure can be particularly desirable during road transport for reducing the overall height of the combine. Such closure further inhibits entrance of dirt, dust, and other detritus into the tank. Such closure may also be desirable during certain harvesting operations for shielding the grain in the tank from rain.

Where possible, and commonly, grain tank covers on combines are retained in an open condition during the harvesting process, enabling an unobstructed top view of the harvested and stored grain, and potentially providing an increase in capacity of the tank by virtue of allowing a central portion of the pile of grain to extend somewhat above the top of the underlying grain tank.

A wide variety of grain storage tank covers are employed in conventional practice. For example, from 2 to 4 metal cover panels can be used to cover the top opening of the tank. Metal covers have the advantage of being strong and sturdy, but have the disadvantage of being bulky, heavy to install, heavy to transport as part of the combine, heavy to lift for opening the cover to thereby expose the top opening of the tank for the above-noted access and use, and such covers can require frequent alignment. To facilitate opening of such heavy covers, gas springs or other resilient apparatus are commonly used to assist in raising the cover panels and thus in opening the tank cover.

Other conventional embodiments of tank covers use flexible sheet material such as canvas or flexible plastic, stretched over a metal or other skeletal framework. Such structures are less heavy, and therefore less cumbersome. However, the flexibility of such cover materials renders the dimensions quite flexible, changeable when erected to thus expose the top opening of the grain storage tank, and potentially enables spillage of contents of the tank where the dimensions of the cover shift during use. In addition, the flexibility of such materials further prevents facile attachment of opening and closing apparatus, whereby facile opening and closing of such covers to enable access to the underlying tank is not enabled.

In addition, tank cover panels which extend upwardly from the outer edge of the tank top opening are somewhat susceptible to wind and other forces having horizontal components. Thus, tank cover panels which extend upwardly from the outer edge of the tank top opening, when in the open position, need to be firmly secured to the walls or other structure of the underlying tank in order to prevent such covers from being adversely affected by the wind. Even where firmly secured, the flexible nature of such flexible sheet materials precludes facile opening and closing of such structures, thus to control access to the tank from above.

It is known to provide permanently-positioned tank cover panels which extend inwardly from the edges of the tank opening, and to have pivoting metal cover panels which pivot upwardly from the permanently-positioned cover panels, whereby an inner portion of the area of the top opening of the grain storage tank can thus be opened to ambient. The advantage of such limited size opening is that the cover panels are sufficiently small as to have sufficiently low mass that simple, light-weight apparatus can be used in lifting of such panels, whereby lifting such panels to open a portion of the top opening for access to the tank is facilitated. However, such limited size opening limits the benefits which attend additional volume capacity of the tank.

It is also known to provide a semi-cylindrical plastic tank cover which entirely closes off the top opening of the tank when the cover is installed. Such plastic cover has a small off-center access panel which slides from an edge of the cover upwardly along the arcuate outline of the cover, thus to provide limited access to the interior of the tank adjacent an edge of the tank. Such semi-cylindrical tank cover thus makes little provision for increasing capacity of the tank at the edge of the tank, whereby only limited capacity increase is available, and is generally by piling the grain in the center of the tank, above the top edge of the tank, and accommodating any cascade of the pile toward the edge of the tank, up to the top edge of the underlying tank. Such conventional tank cover thus makes little provision for increasing capacity of the tank.

In the above noted conventional tank covers, in those covers which provide increased height of the tank, thereby to increase tank capacity, the cover panels are separate and distinct from each other; and any spaces between the respective covers constitute potential for spillage of the grain when the grain in the tank reaches above the top edge of the underlying tank. Some of such tank covers provide rigid filler panels which bridge and fill the spaces between the respective primary and/or secondary panels. However, such rigid filler panels are expensive to build, are mechanically complex, and constitute substantial extra weight.

Another method of dealing with spacing between adjacent cover panels is to structure the tank cover such that spacing tolerances between surfaces and/or edges of adjacent tank cover panels are carefully controlled. Such careful control in manufacture of the panels, as well as in the assembly of the panels, is costly, is subject to failure, and can require frequent adjustment.

It would thus be desirable to provide a tank cover which is rigid, durable, and strong, which is sufficiently light in weight such that the entire tank cover can be raised by a single simple underlying mechanical linkage energized by a low power lift mechanism, and which has low cost, easily maintained closures at the corners of the tank cover so as to limit spillage of grain at the tank corners.

It is a further objective to provide a such tank cover which adds substantially to the carrying capacity of the combination of tank plus cover when the cover is open and fully erect.

It is yet another object to provide a such tank cover wherein the underlying mechanical linkage is also configured to, simultaneously with lifting of the cover panels to thereby open the tank cover, lift the clean grain elevator, to an elevation above the top edge of the underlying tank, whereby grain can be expelled into such tank-plus-cover combination by the elevator at an elevation well above the top edge of the underlying tank, and whereby the capacity of such tank-plus-cover combination can be increased up to the top edges of the vertically-extending cover panels.

SUMMARY

This invention provides novel covers for grain storage tanks on harvesting machines such as combines. Rigid cover panels of the cover are preferably fabricated, as a double-wall structure, of generally rigid polymeric sheet materials so as to limit weight of the cover while providing desired levels of strength and rigidity. The rigid cover panels can be pivoted about the top edges of an underlying grain storage tank whereby the cover panels are transformed into a height extension of the underlying grain storage tank, thus to increase the grain-carrying capacity of the underlying tank. Flexible transition panels are preferably mounted to the rigid cover panels so as to bridge spaces between the rigid cover panels when the rigid cover panels are raised to their upright, tank-extending orientations. A preferably single underlying actuator in the tank, in combination with mechanical linkages, simultaneously raises all the rigid cover panels, all the flexible transition panels, and the discharge end of the clean grain elevator which discharges grain into the tank.

In a first family of embodiments, the invention comprehends a grain storage tank cover for use in combination with an underlying grain storage tank on an agricultural harvesting machine. Such grain storage tank has a plurality of walls defining an underlying tank structure, and a top opening to be overlain and closed by the grain storage tank cover. The grain storage tank cover comprises a plurality of rigid polymeric cover panels each having a proximal edge, an opposing distal edge, and side edges. The polymeric cover panels are adapted for pivoting attachment to such underlying grain storage tank at the proximal edge such that each cover panel, when attached to such grain storage tank, is adapted to pivot at such proximal edge and thereby to pivot between a closed position covering at least a portion of the top opening, and an open position facilitating access to such grain storage tank from above. The plurality of rigid polymeric cover panels are adapted collectively to close a such top opening of the underlying tank when pivoted downwardly, and to expose such top opening of the underlying tank when pivoted upwardly.

The tank cover preferably comprises a single lifting and lowering actuator underlying and connected to the cover panels by a single mechanical linkage assembly, for pushing the cover panels upwardly, and for lowering such cover panels, in pivoting motions about edges of the top opening of the underlying tank.

The tank cover preferably includes flexible fabric transition panels, each mounted to respective adjacent ones of the rigid cover panels proximate the side edges of the rigid cover panels, so as to bridge, and thereby close, any open space between the side edges of the respective adjacent cover panels when the tank cover is open, and to fall by gravity into the underlying grain storage tank when the rigid tank cover panels are moved to a closed position.

In some embodiments, the plurality of tank cover panels comprise first and second opposing primary cover panels, and third and fourth opposing support cover panels, oriented, in the open configuration, generally perpendicular to the first and second primary cover panels and adapted for pivoting attachment to an underlying grain storage tank at proximal edges of the cover panels. When attached to such underlying grain storage tank, each such third and fourth polymeric cover panel is adapted to pivot at the proximal edge of the respective cover panel and thereby to pivot between a closed position covering at least a portion of the top opening, and an open position facilitating access to such grain storage tank from above. Each of the flexible fabric transition panels is secured to, and serves as a closure between, one of the primary cover panels and one of the support cover panels.

In preferred embodiments, the compositions of the polymeric cover panels comprise acrylonitrile butadiene styrene copolymer.

In preferred embodiments, the rigid polymeric cover panels comprise double wall construction defining crossing networks of intersecting ribs on corresponding walls of a given cover panel.

Also in preferred embodiments, the flexible fabric panels comprise composite sheet material. The composite sheet material comprises a fibrous substrate, and an abrasion resistant polymeric coating on the fibrous substrate. The flexible fabric panels having sufficient mass, and are so attached to the cover panels, that when the cover panels are lowered to thereby close the top opening, central portions of the transition panels are pulled by gravity so as to move downwardly into the underlying grain storage tank and away from the rigid cover panels.

In preferred embodiments, the mechanical linkage assembly comprises underlying mechanical linkages connecting the single actuator to each of the rigid polymeric cover panels. The single actuator, when mounted to such underlying grain storage tank and in combination with the mechanical linkages, being effective, upon actuation of the actuator, to cooperatively lift or lower all of the polymeric cover panels, thereby to open or close the grain storage tank cover over the tank.

In preferred embodiments, the mechanical linkages include elevator mounting structure for mounting the clean grain elevator to the mechanical linkages such that, when the actuator is activated to open or close the cover panels, an elevator mounted to the elevator mounting structure is cooperatively raised or lowered in such underlying grain storage tank, preferably while the cover panels are correspondingly being raised or lowered.

In preferred embodiments of the tank cover, first and second ones of the rigid polymeric cover panels, when the cover is closed, form a joint therebetween at respective distal edge regions of the respective cover panels, and cooperatively define a rain gutter therebetween effective to direct rain water toward side edges of the first and second rigid polymer cover panels.

In a second family of embodiments, the invention comprehends a grain storage tank cover, for use in combination with an underlying grain storage tank on an agricultural harvesting machine. The underlying tank has a plurality of walls defining an underlying tank structure, and a top opening to be overlain and closed by the grain storage tank cover. The grain storage tank cover comprises at least a first pair of opposing generally rigid polymeric cover panels, adapted for pivoting attachment to such underlying grain storage tank. When attached to such grain storage tank, each such pair of rigid polymeric cover panels is movable between a closed position covering at least a portion of the top opening, and an open position facilitating access to such grain storage tank from above. The tank cover further comprises actuator apparatus comprising a single lifting and lowering actuator underlying, and connected to, the rigid polymeric cover panels, and mechanical linkages underlying the cover panels and connecting the single actuator to each of the polymeric cover panels. The single actuator, when mounted to such underlying grain storage tank and in combination with the mechanical linkages, is effective, upon actuation of the actuator, to cooperatively and preferably simultaneously lift all of the rigid polymeric cover panels, thereby to open the grain storage tank cover.

In preferred embodiments, the single lifting and lowering actuator extends upwardly along an arcing path, and pushes the cover panels upwardly in pivoting motions about edges of such top opening.

In a third family of embodiments, the invention comprehends a grain storage tank cover, for use in combination with an underlying grain storage tank on an agricultural harvesting machine. Such grain storage tank has a plurality of walls defining an underlying tank structure, and a top opening to be overlain and closed by the grain storage tank cover. The grain storage tank cover comprises at least first and second opposing generally rigid cover panels, which may or may not be plastic, and may in this family of embodiments be metal. Each such rigid cover panel has a proximal edge, an opposing distal edge, and side edges. The cover panels are adapted for pivoting attachment to such underlying grain storage tank at the proximal edges and, when so attached to such grain storage tank for pivoting about the proximal edges, each such rigid cover panel is movable between a closed position covering at least a portion of the top opening, and an open position facilitating access to such grain storage tank from above. The cover further comprises flexible fabric transition panels, each mounted to respective adjacent ones of the generally rigid cover panels proximate the side edges of the cover panels, so as to bridge, and thereby close, any open spaces between respective adjacent ones of the side edges of the respective adjacent cover panels when the tank cover is open, and wherein central portions of the transition panels fall by gravity into such grain storage tank when the tank cover is closed.

In some embodiments, the first and second generally rigid cover panels comprise primary cover panels. The tank cover further comprises third and fourth opposing generally rigid support cover panels, oriented generally perpendicular to the first and second cover panels when in the open configuration, and adapted for pivoting attachment to such underlying grain storage tank. When attached to such underlying grain storage tank, each such third and fourth cover panel is movable between a closed position covering at least a portion of the top opening, and an open position facilitating access to the grain storage tank from above. Each of the flexible fabric transition panels is secured to, and serves as a closure between, one of the primary panels and one of the support panels.

Figure 1:
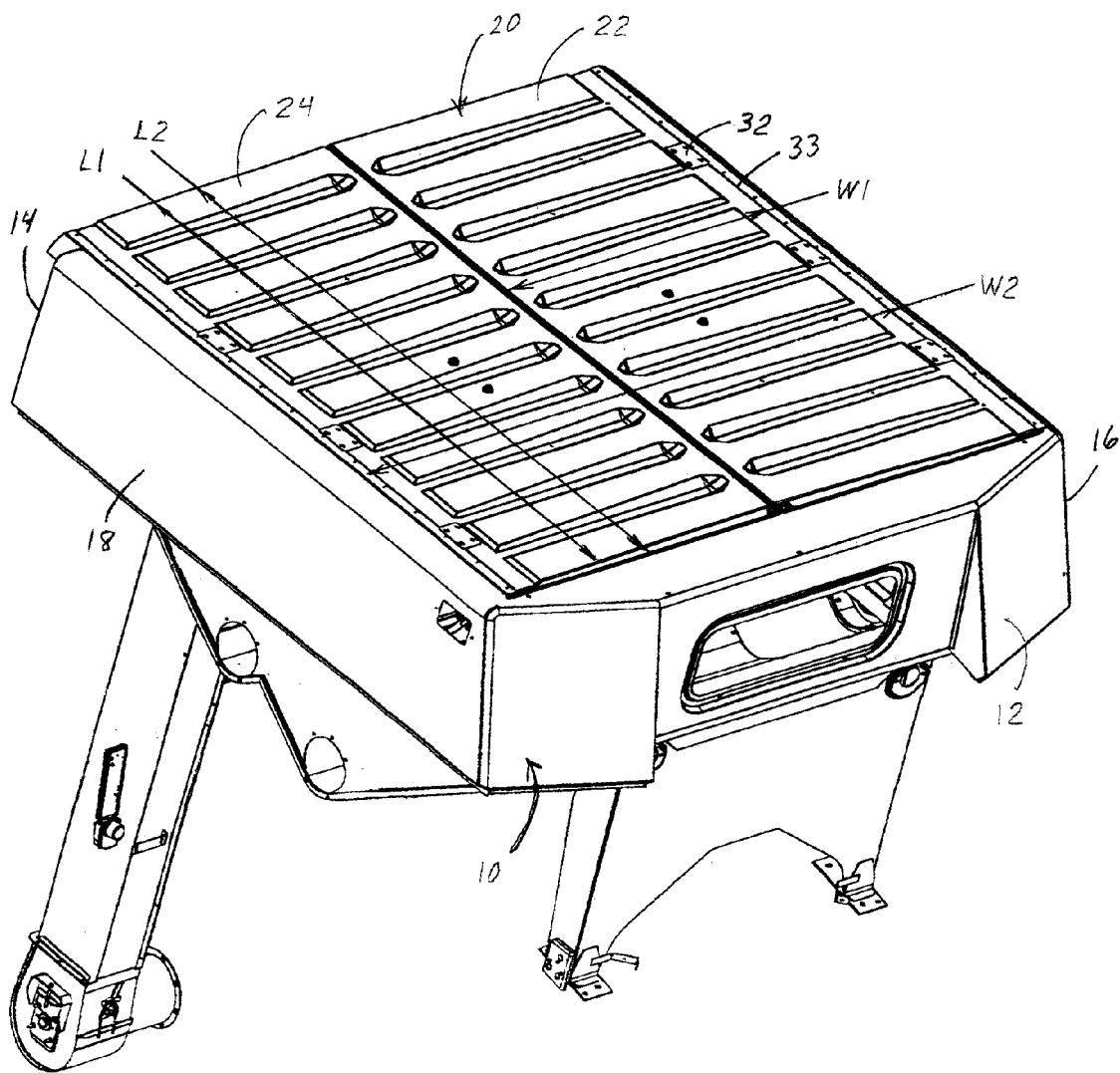
FIG. 1 shows a pictorial view of a tank cover of the invention, installed on a grain storage tank, and with the cover closing the top opening of the tank.

The invention is not limited in its application to the details of construction or the arrangement of the components set forth in the following description or illustrated in the drawings. The invention is capable of other embodiments or of being practiced or carried out in other various ways. Also, it is to be understood that the terminology and phraseology employed herein is for purpose of description and illustration and should not be regarded as limiting. Like reference numerals are used to indicate like components.

DESCRIPTION OF THE ILLUSTRATED EMBODIMENTS

Figure 2:
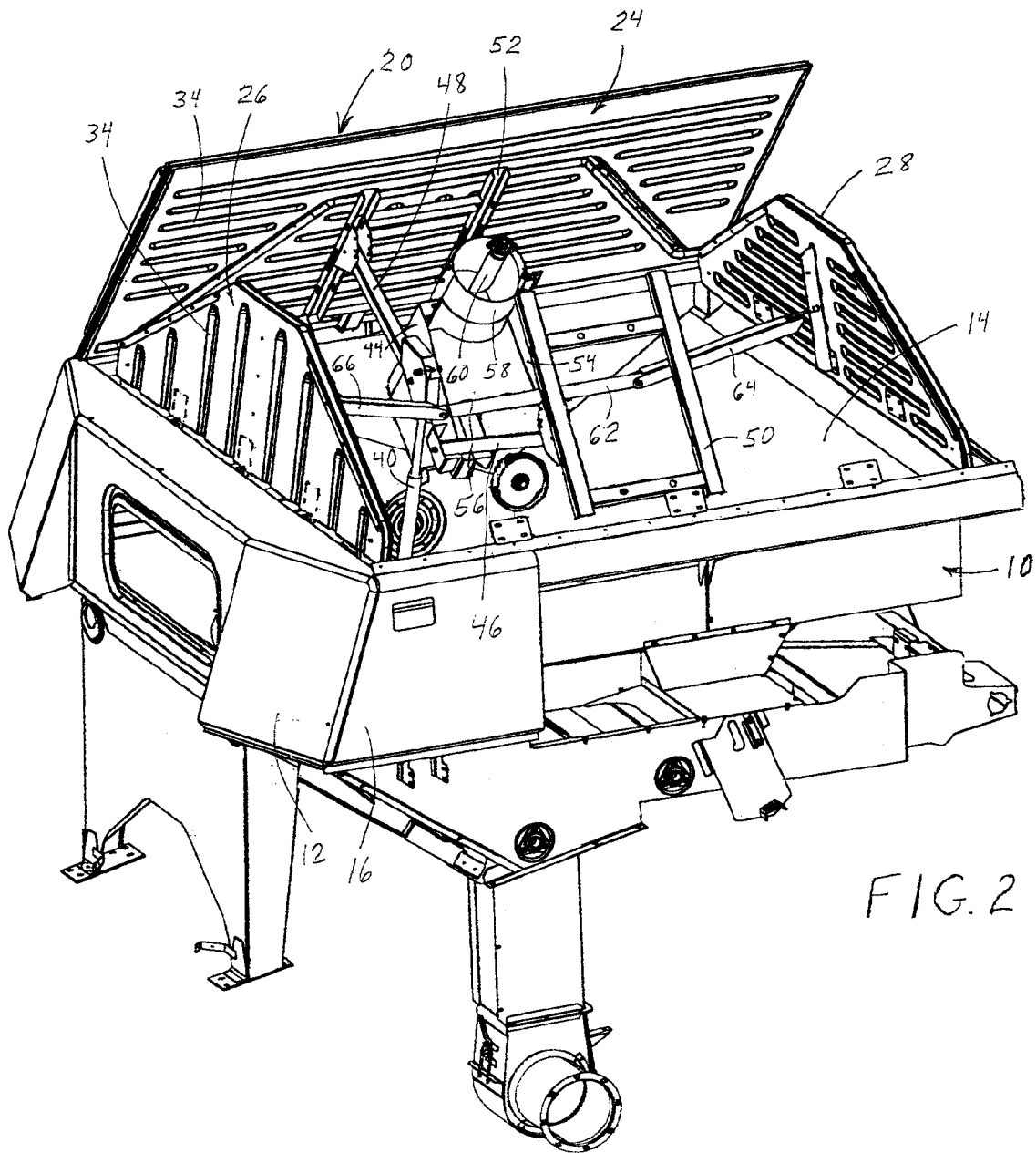
FIG. 2 shows a pictorial view of a tank cover of the invention, installed on a grain storage tank as in FIG. 1, from a different angle than in FIG. 1, with parts removed, and with the cover partially open to expose cover structural elements in the tank.

Referring now to FIGS. 1 and 2, the top portion of a grain storage tank 10 represents a top opening of generally rectangular configuration, including a front wall 12, a rear wall 14, a left wall 16, and a right wall 18. Walls 12, 14, 16, and 18 converge toward the bottom of the tank to thereby define a bottom of the tank, and thereby define a corresponding receptacle, suitable for receiving grain harvested and cleaned by the harvester.

Figure 3:
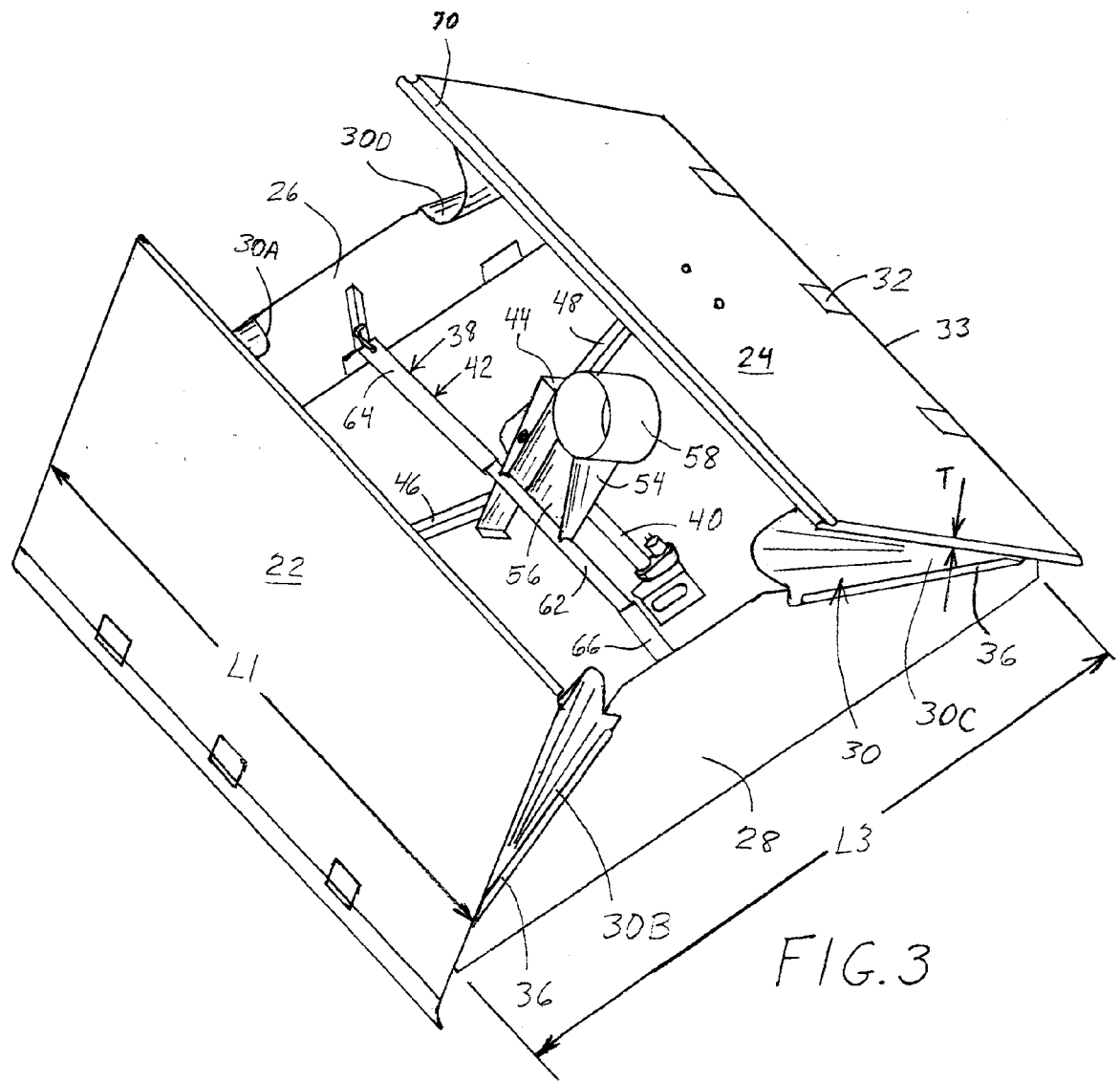
FIG. 3 shows a pictorial view of a tank cover of the invention, partially open and off the tank, and illustrating the flexible fabric transition panels bridging the spaces between respective ones of the rigid cover panels at corners of the cover.

Referring now also to FIG. 3, tank cover 20 includes a left primary cover panel 22, a right primary cover panel 24, a front support cover panel 26, and a rear support cover panel 28. Flexible transition panel 30A bridges the open space between primary cover panel 22 and support cover panel 26. Flexible transition panel 30B bridges the open space between primary cover panel 22 and support cover panel 28. Flexible transition panel 30C bridges the open space between primary cover panel 24 and support cover panel 28. Flexible transition panel 30D bridges the open space between primary cover panel 24 and support cover panel 26. The respective flexible transition panels generally extend from the base of the respective cover panels adjacent the top of the tank to the distal ends of the respective cover panels adjacent side edges of the respective cover panels.

In general, each primary cover panel 22, 24 has a length "L1" which corresponds to the respective length dimension "L2" of the top opening of underlying tank 10. Each primary cover panel has a width "W1" which corresponds to about half the width "W2" of the top opening of the underlying tank. Each support cover panel 26, 28 has a length "L3" which corresponds to the respective width dimension "W2" of the top opening of the underlying tank.

Cover panels 22, 24, 26, 28 are mounted to underlying tank 10, or to a cover perimeter frame (not shown), by hinges 32, thus to pivot about hinges 32 adjacent the edges of the top opening of the tank. When the cover panels are mounted to a perimeter frame of the cover, the frame is mounted to the underlying tank whereby the affect is still pivotation of the cover panels adjacent the perimeter of the top opening of the tank. Accordingly, as used herein and in the claims which follow, pivotation of the cover panels adjacent the tank top opening includes both direct hinging of the cover panels to the tank and hinging of the cover panels to a cover frame which is in turn mounted to the tank adjacent the perimeter of the top opening of the tank.

When cover panels 22, 24, 26, and 28 are opened to generally vertical orientations, the combination of the cover panels serve to extend the height of the tank over generally the fill area of the top opening of the tank. Thus, by judiciously employing the transition panels between the edges of the respective cover panels, the tank cover of the invention is transformed into a tank extension so as to increase the holding capacity of the respective tank. By extending the cover panels e.g. the height of half of the width of the underlying tank, the capacity of the underlying grain tank can be increased by as much as 30%–35% without adding to the permanent dimensions of the tank. Controlling the height of the tank is especially important as the tank is usually at the top of the combine and the overall height of the combine is restricted in certain countries by height restrictions which apply to all vehicles which use the roads. Combines must use the roads to move from job site to job site, whereby such height restrictions are material to the dimensions of the tank.

When cover 20 is closed over the top opening of the tank as in FIG. 1, flexible transition panels 30A, 30B, 30C, 30D are disposed inside the tank. As the cover panels are raised, the transition panels rise with the cover panels, and extend across the open spaces between the side edges of the cover panels. As the cover panels are subsequently lowered, the edges of the cover panels move downwardly toward the interior of the tank. The transition panels are sufficiently heavy, and sufficiently flexible that central portions of the transition panels fall downwardly, sagging at central portions of the free spans thereof between the cover panels, whereby the transition panels reliably droop and fall into the interior of the tank. Thus, the transition panels reliably droop into the tank when cover 20 is closed and extend in a generally full stretched condition between panels 22, 24, 26, and 28 when the cover panels are fully erected in generally vertical orientations.

In order to control the weight of cover 20, and the energy required to open the cover panels, the material used to make cover panels 22, 24, 26, 28 must be light in weight. However, the material used for the cover panels must necessarily possess a number of other properties. Thus, the material must be rigid and durable, and sufficiently strong to withstand the forces imposed on a combine cover in routine use. The cover must be able to withstand normal weather incidents such as rain, wind, sleet, hail, snow, and the like from outside the tank. In addition, the cover must be able to withstand routine brushing and the like by branches of trees adjacent the field. The respective cover panels must be able to withstand the lifting forces required in raising and lowering the cover panels when the cover is opened or closed. The cover panels must be amenable to intimate contact with the grain which is temporarily stored in the tank during the harvesting operation.

While steel is commonly used for conventional cover panels covering grain storage tanks, steel is quite heavy, and requires painting and maintenance thereof. The commercial market indicates that customers tend to desire increasingly larger grain storage tanks on their combines. Indeed, an after market has developed in tank extenders whereby customers add extension panels about the top edges of the grain storage tank thereby to increase the volumetric capacity of the respective grain storage tank. Combine manufacturers have responded by increasing the nominal sizes of the grain storage tanks on their combines. In increasing the nominal sizes of the grain storage tanks on the combines, the length and width dimensions of the tanks have been increased. Correspondingly, the length and width of the cover panels have necessarily been increased. As the length and width of a cover panel is increased, the weight of the panel is increased. As the weight of the panel is increased, the energy necessary to open the panel is increased, as well as the difficulty of suitably distributing that energy over the full length and width of the panel. Further, as length, width, and weight of the cover panels has increased, so has the difficulty of maintaining rigidity of such cover panels increased.

In this invention, the material used to fabricate panels 22, 24, 26, and 28 is preferably plastic. The specific plastic can be any material which has suitable strength and rigidity properties as set forth above to serve the environment in which the cover panels are routinely used. Such material can be, for example and without limitation, acrylonitrile butadiene styrene copolymer (ABS), high density polyethylene (HDPE), ultra high density polyethylene (UHDPE), or polyamide. Other materials, which meet the required performance criteria, will be known to those skilled in the art. However, it is the inventors' experience that the above materials best meet the required performance criteria while controlling cost of production of such cover panels. The most preferred material for use in making the cover panels is ABS because of its cold weather durability.

Whatever polymeric material is used to make the cover panels, a multiple layer construction is preferred in order to obtain the desired strength and rigidity at a desired weight. To achieve such strength/weight combination, in the illustrated embodiments, each cover panel is made of two layers of ABS. Each layer is fabricated with a plurality of parallel ribs 34, the ribs extending inwardly from an outer panel surface toward the interior of the panel. The ribs on the layer which forms the outside surface of the panel extend from loci adjacent the proximal edge of the cover panel toward the distal edge of the cover panel. Such ribs thus extend along the height of the panel when the panel is in the erect, vertical orientation and serve to direct precipitation downwardly off the respective cover panel. The ribs on the layer which forms the inside surface of the panel extend generally from side edge to side edge of the respective panel, and thus are generally disposed in horizontal orientations when the panels are in the erect, vertical orientation.

The cover panel construction, seen especially in FIG. 2, defines a network of first and second arrays of ribs on the inner and outer layers of a given cover panel, the arrays of ribs on the respective layers intersecting each other, and are preferably perpendicular to each other. Such first and second arrays of ribs thus intersect each other at regularly spaced locations about the area of the respective cover panel. The ribs can be bonded or otherwise secured to each other at such intersections or at other suitable loci, by welding, by adhesive, or the like, thereby to improve the integrity, rigidity, and other strength properties of the cover panel. Each of the respective layers used to form e.g. cover panel 22 for covering a 100 bushel tank 10 can be about 2 mm to about 10 mm thick, with a preferred thickness of about 5 mm. Overall average thickness of a respective cover panel between the inner and outer surfaces of the respective cover panel is about 38 mm to about 127 mm, with preferred average overall thickness of about 76 mm.

In order for rain to run off the tank cover when the cover is closed, the top of the tank cover should slope downwardly away from a central portion toward hinge edge 33. To that end, the overall top surface, less ribs 34, slopes accordingly.

To achieve the desired slope, and assuming that cover panels 22, 24, close against horizontal receiving surfaces, thickness "T" of each of cover panels 22, 24, between the overall top surface, and a corresponding bottom surface, again less ribs 34 on the bottom surface, is greater at the respective distal edge region 68, 70 and relatively less at hinge edge 33. Typically, the differences in thickness "T" between the respective distal edge region and the corresponding hinge edge is about 25 mm to about 102 mm, preferably about 51 mm. An exemplary cover panel 22, 24 has a thickness of about 51 mm at the hinge edge and a thickness of about 102 mm at the distal edge region. Other thickness dimensions and configurations can be used so long as a generally positive slope is achieved at the outer surface of the respective cover panels for shielding rain water and the like.

Flexible transition panels 30 can be made of a wide variety of flexible materials. Such material must be suitably tough to withstand the working environment of the combine. The material must be suitably non-extensible to not be stretched so as to be pinched between the edges of the cover panels when the cover is lowered into the closed position. The material must be suitably abrasion resistant to tolerate the abrasion of the grain stored in the tank, as well as to tolerate dust, soil, and other detritus carried into the tank along with the grain. In addition, the transition panel material must be sufficiently heavy, while retaining suitable flexibility, to flex as the cover panels are lowered to close the tank, whereby central bridging portions of the cover panels fall by gravity into the tank ahead of the cover panels.

Any material can be used in fabricating the transition panels so long as the resulting transition panels substantially meet the above performance criteria. Exemplary suitable material has a fibrous core layer of e.g. woven or non-woven polyester fabric covered on both surfaces with a highly abrasion resistant layer of polyvinyl chloride copolymer, including suitable additives to provide weather resistance in the resulting transition panels. A suitable such material weighs about ounces per square yard. Such multiple layer material can be obtained from Reeves International, Spartanburg, S.C., as: H177086, H177087. Typical properties of such material are shown in Table 1.

TABLE 1

| Coated Fabric Properties | Test Method | Typical |
| --- | --- | --- |
| Weight | ASTM D 751-89 Seq. 10.2 | 35.0 oz/yd$^2$ |
| Grab Tensile Warp Fill | ASTM D 751-89 Seq. 12 | 500 lbs. 480 lbs. |
| Tongue Tear Warp Fill | ASTM D 751-89 Seq. 29 | 150 lbs. 150 lbs. |
| Taber Abrasion Face Side | ASTM D 3389-87 (Method A) | 10,000 (H-22 wheal, 1000 gm. load) |
| Temperature Tolerance | ASTM D 2236-84 | 50° F. |

Transition panels 30 are attached to the cover panels adjacent respective edges of the cover panels. FIG. 3 illustrates mounting bars 36 on support cover panel 28. Edges of transition panels 30 are positioned between mounting bars 36 and the outer surface of support cover panel 28. Mounting bars 36 are secured to cover panel 28 using screws or like fasteners, the fasteners passing through the transition panel material and thence into the cover panel. The transition panel is thus trapped between the mounting bar and the cover panel and is further held to the cover panel by the screws passing through the transition panel material. Each transition panel is mounted to each of the two cover panels bridged thereby, using mounting bars 36 or like mounting structure.

When the cover panels are raised to the full open vertical orientation, the cover panels form an upward extension of substantially the full cross-sectional area of the tank top opening, including providing full perimeter closure of the extension at corners of the extension, in the form of the transition panels, extending from positions adjacent the top edge of the underlying grain storage tank to substantially the full height of the extension.

Referring now to FIGS. 2 and 3, cover 20 can be raised to the fully erect position wherein the cover panels are in vertical orientations, and can be lowered to the closed orientation shown in FIG. 1, by an underlying actuator mechanism generally designated as 38. Actuator mechanism 38 comprises a single driving actuator such as a single electric cylinder 40, and an assemblage 42 of mechanical linkages which link cylinder 40 to cover panels 22, 24, 26, and 28. Cylinder 40 is mounted to an underlying wall or like structure of tank 10 and pushes upwardly from the tank on the assemblage of mechanical linkages, along an arcing path.

Assemblage 42 includes a power distribution bracket 44 which is mounted for pivotation to the upper, ram end of cylinder 40. Actuator arms 46 and 48 are mounted for pivotation to power distribution bracket 44. Actuator arms 46, 48 extend along a generally rising upward path to, and are mounted for pivotation to, ladder brackets 50, 52. Ladder brackets 50 and 52 are fixedly mounted to primary panels 22 and 24 such as by screws, bolts, or the like. Each of actuator arms 46 and 48 is thus effectively mounted for pivotation to both power distribution bracket 44 and one of primary cover panels 22 and 24.

Grain elevator bracket 54 extends generally parallel to power distribution bracket 44. Bridge bracket 56 extends generally perpendicular to power distribution bracket 44 and elevator bracket 54, and is fixedly secured such as by welding to both brackets 44 and 54. An elevator mounting collar 58 is fixedly mounted such as by welding to elevator bracket 54, and optionally to brackets 44 and 56. Collar 58 can be made to expand and contract so as to receive therein a cylindrical elevator such as clean grain elevator 60 as illustrated in FIG. 2.

Support bar 62 is fixedly mounted as by welding to distal ends of brackets 54 and 56, as well as being mounted to power distribution bracket 44. Support bar 62 extends in a generally horizontal orientation in the direction of the length "L1" of the cover. Actuator arms 64, 66 are mounted at first ends of such actuator arms for pivotation about opposing ends of support bar 62. Actuator arm 64 extends along a generally rising upward path to, and is mounted for pivotation, at a second end of actuator arm 64, opposing the first end of actuator arm 64, to support cover panel 28. Actuator arm 66 extends along a generally rising upward path to, and is mounted for pivotation, at a second end of actuator arm 66, opposing the first end of actuator arm 66, to support cover panel 26.

Given the above described structure and mechanical linkages, extension of the ram of cylinder 40 raises power distribution bracket 44 along an arcing path. The arcing path is converted by the mechanical linkages into multi-directional simultaneous upward deployment of the four cover panels to thus enlarge the volume capacity of the grain storage tank. Namely the extension of the ram raises actuator arms 46, 48, support bar 62, and brackets 54, 56. Support bar 62 raises actuator arms 64 and 66. Elevator bracket 54 raises mounting collar 58. As a result of the above risings, when cylinder 40 is extended, the cooperating assemblage of linkages is effective to lift all of cover panels 22, 24, 26, and 28, transition panels 30A, 30B, 30C, and 30D, and mounting collar 58, along with any grain elevator mounted in mounting collar 58.

Restated, raising the ram of cylinder 40 opens the cover and raises the clean grain elevator. As the cover panels reach their full open, generally vertical orientations, the clean grain elevator reaches a height sufficient to take full advantage of the extended height of the grain tank with the cover panels so erected. Namely, the discharge end of the clean grain elevator is high enough to fill grain to approximately the top of the extended height of the tank.

Correspondingly, when the ram of cylinder 40 is retracted, the clean grain elevator is lowered into the main body of tank 10, and cover 20 is closed over the top opening of the tank.

Since the cover panels are preferably made of light weight plastic material, since the transition panels are also made of comparatively light weight material, the overall weight of cover 20 is substantially less than the weight of an otherwise similar cover comprising 4 steel cover panels, albeit using a single layer of steel for each cover panel. Since the weight of the cover panels is substantially less than the weight of corresponding steel cover panels, it is possible to use a single underlying actuator such as cylinder 40 to cooperatively and simultaneously lift all of the respective cover members through a single set of interconnected mechanical linkages, whereby a single mechanical actuation is effective to open the cover and lift the clean grain elevator to its maximum discharge height.

In conventional covers using e.g. 4 steel cover panels in place of cover panels 22, 24, 226, 28, without any transition panels, the cover panels must be carefully oriented with respect to the tank and with respect to each other, so as to provide close clearances between the cover panels when the panels are erected, without the panels interfering with each other when so erected. Indeed, any twisting of the underlying tank 10 can cause misalignment of the cover panels with respect to each other, and corresponding interference between the respective cover panels such that the cover panels may not open properly, or close properly, when desired. The cure for such potential misalignment, in such conventional covers, is to assemble the cover to the tank with increased space between respective ones of the cover panels. But such increased space between the cover panels results in grain spillage from the tank through such increased spaces.

Figure 4:
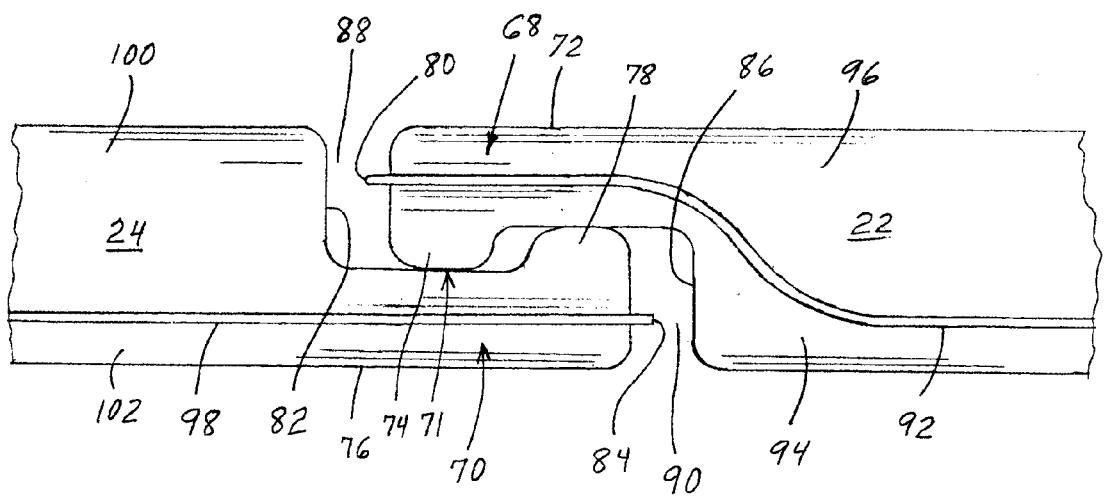
FIG. 4 shows a side elevation of portions of the distal edges of the primary cover panels, illustrating the cooperating overlap of the cover panels which acts like a rain gutter.

FIG. 4 illustrates the cooperative configurations of the primary cover panels at distal edge regions 68, 70. As seen in especially FIG. 4, edge regions 68 and 70, of cover panels 22 and 24, collectively define a closure joint 71 where the primary cover panels meet. Edge region 68 includes a reduced thickness portion 72 configured as a straight extension of the top surface of cover panel 22, and having a downwardly disposed rib 74. Edge region 70 includes a reduced thickness portion 76 configured as a straight extension of the bottom surface of cover panel 24, and having an upwardly disposed rib 78. Edge regions 68 and 70 overlap each other so as to form a closed joint when cover 20 is closed. The reduced thicknesses of portions 72 and 76, along with ribs 74 and 78, define a combined thickness of cover panels 22 and 24 at the joint which approximates the respective individual thicknesses of cover panels 22 and 24 away from edge regions 68 and 70.

Rib 74 engages the inner surface of reduced thickness portion 76. Rib 78 engages the inner surface of reduced thickness portion 72. Distal edge 80 of edge region 68 is spaced from proximal edge 82 of edge region 70. Distal edge 84 of edge region 70 is spaced from proximal edge 86 of edge region 68. The spacing of the distal edges from the proximal edges of the edge regions creates void spaces 88 and 90 between the respective distal edges and the corresponding proximal edges. As illustrated in FIGS. 3 and 4, upwardly open void space 88 comprises a channel which receives rain water and directs such rain water along the channel toward one or both side edges of the primary cover panels. Cooperatively, ribs 74 and 78 serve as dams to prevent the rain water from entering the underlying grain storage tank. Since the channel defined by void space 88 presents an easier path of flow, the rain water preferentially flows along the channel to the ends of the cover panels and is effectively prevented from entering the tank through joint 71. Thus, the channel at void space 88, in combination with ribs 74 and 78 act like a rain gutter to direct water off the cover panels at joint 71.

Still referring to FIG. 4, joint 92 on cover panel 22 defines a weld line or other method of joining a lower sheet layer 94 of the cover panel to an upper sheet layer 96 of the cover panel. Similarly, joint 98 on cover panel 24 defines a weld line or other method of joining an upper sheet layer 100 of the cover panel to a lower sheet layer 102 of the panel. The respective layers of the plastic material are fabricated into desired shapes, including ribs 34, proximal edges, distal edges, and side edges, and the respective layers are then joined as by welding, adhesive, or other joining method to form the joints 92, 98 such that the respective layers are generally substantially spaced from each other except at bonding loci such as joints 92, 98, and loci where the intersecting ribs are bonded to each other. The resulting cover panels, 22, 24, 26, and 28 are generally hollow, thereby limiting the weight of the cover panels while the spacing between the upper and lower layers provides for substantial strength in the panels according to I-beam principles and the bonding at the intersecting ribs as well as the edge joints 92, 98 combines the two layers into a unitary structure.

A distinct advantage of grain storage tank covers of the invention, using transition panels 30, is that the cover can be assembled to the grain tank with a wide range of acceptable sizes of spacings between respective ones of the cover panels. Indeed, in view of the use of transition panels 30, the distance between cover panels when erected is preferably greater than spacings preferred when no transition panel is used, so as to provide more space than is contemplated will be used in even the worst of twisting of the underlying tank, or twisting of the cover panels. Thus, dimensions between edges of respective cover panels, at loci of closest approach, when erected are at least 2 inches, preferably between 4 inches and 12 inches. Indeed, referring to e.g. FIG. 2, support cover panels are regular trapezoids, not rectangles, in order to further reduce the weight of panels 26, 28 while using transition panels 30A–30D to fill in the corresponding space between the support panels and the primary panels. In addition, the trapezoidal shape of support cover panels 26, 28 provides corner closure through substantially the full operating range of cover panel closure, from minimally open wherein the cover panels are only minimally erected, to full open.

The illustrated embodiments show support cover panels 26, 28 on the ends of the cover, and bridging transition panels 30 bridging between the support cover panels and the primary cover panels. In certain embodiments, and especially where the width "W2" of the tank top opening is less than the length "L2" of the tank top opening, the assemblage of each support panel cover and 2 transition panels can be replaced by a single transition panel. In such embodiment, the entirety of the cover panels comprises the primary cover panels 22 and 24, and respective first and second transition panels extend between the respective side edges of the primary cover panels, and form the entirety of the end walls of the fully erected cover as the cover forms the extension of the top opening of the underlying tank. Use of such fabric end walls of the cover eliminates support cover panels 26, 28, and thus eliminates the need for actuator arms 64, 66 and the associated linkages to the support cover panels, thereby further simplifying the mechanical linkage assembly used to erect the cover.

As used herein, "rigid" cover panels means panels which are suitably rigid to hold necessary form for efficiently opening and closing the top opening of the underlying tank while maintaining a generally constant outer surface configuration of such cover panels.

Those skilled in the art will now see that certain modifications can be made to the apparatus and methods herein disclosed with respect to the illustrated embodiments, without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

To the extent the following claims use means plus function language, it is not meant to include there, or in the instant specification, anything not structurally equivalent to what is shown in the embodiments disclosed in the specification.

Having thus described the invention, what is claimed is:

1. A grain storage tank cover, for use in combination with an underlying grain storage tank on an agricultural harvesting machine, such grain storage tank having a plurality of walls defining an underlying tank structure, and a top opening to be overlain and closed by said grain storage tank cover, said grain storage tank cover comprising a plurality of rigid cover panels each having a proximal edge, an opposing distal edge, and side edges, at least first (22) and second (24) said cover panels each comprising a first layer (94, 102) and a second layer (96, 100) generally spaced from each other and joined together at spaced locations and including the layers being joined to each other at spaced locations away from collectively said proximal edge, said distal edge, and said side edges, said cover panels being adapted for pivoting attachment to such underlying grain storage tank at the proximal edges such that each said cover panel, when attached to such grain storage tank, is adapted to pivot at such proximal edge and thereby to pivot between a closed position covering at least a portion of the top opening, and an open position facilitating access to such grain storage tank from above, the plurality of rigid cover panels being adapted collectively to close the top opening when pivoted downwardly, and to expose such top opening when pivoted upwardly.

2. A grain storage tank cover as in claim 1 wherein said rigid cover panels comprise rigid polymeric cover panels.

3. A grain storage tank cover as in claim 2, and further comprising a single lifting and lowering actuator underlying and connected to said cover panels by a single mechanical linkage assembly, and providing all lifting force required for pushing the cover panels upwardly, from a configuration where the cover panels close the top opening, in pivoting motions about edges of the top opening.

4. A grain storage tank cover as in claim 3, said mechanical linkage assembly comprising underlying mechanical linkages connecting said single actuator to each of said polymeric cover panels, said single actuator, when mounted to such underlying grain storage tank and in combination with said mechanical linkages, being effective, upon actuation of said actuator, to cooperatively lift or lower all of said polymeric cover panels, thereby to open or close said grain storage tank cover.

5. A grain storage tank cover as in claim 1, further comprising a lifting and lowering actuator underlying and connected to said cover panels by mechanical linkages, said mechanical linkages including elevator mounting structure for mounting a grain elevator, delivering grain to such grain storage tank, to said mechanical linkages such that, when said actuator is activated to open or close said cover panels, an elevator mounted to said elevator mounting structure is cooperatively raised or lowered in such underlying grain storage tank.

6. A grain storage tank cover as in claim 1 wherein said cover, with said cover panels in the open and upright orientation, serves as an upward extension of the underlying grain storage tank, thereby to temporarily increase capacity of such underlying grain storage tank so long as said cover panels are in the open and upright orientation.

7. A grain storage tank cover as in claim 1, said grain storage tank cover comprising first and second primary cover panels, each said primary cover panel having a thickness (T) between upper and lower surfaces thereof, the thickness (T) adjacent the distal edge being greater than the thickness (T) at the proximal edge.

8. A grain storage tank cover as in claim 7, average thicknesses (T) of said primary panels being about 25 mm to about 102 mm.

9. A grain storage tank cover for use in combination with an underlying grain storage tank on an agricultural harvesting machine, such grain storage tank having a plurality of walls defining an underlying tank structure, and a top opening to be overlain and closed by said grain storage tank cover, said grain storage tank cover comprising:

(a) a plurality of rigid polymeric cover panels each having a proximal edge, an opposing distal edge, and side edges, said polymeric cover panels being adapted for pivoting attachment to such underlying grain storage tank at the proximal edge such that each said cover panel, when attached to such grain storage tank, is adapted to pivot at such proximal edge and thereby to pivot between a closed position covering at least a portion of the top opening, and an open position facilitating access to such grain storage tank from above, the plurality of rigid polymeric cover panels being adapted collectively to close a such top opening when pivoted downwardly, and to expose such top opening when pivoted upwardly; and (b) flexible fabric transition panels, each mounted to respective adjacent ones of said rigid cover panels proximate the side edges of said rigid cover panels, so as to bridge, and thereby close, any open space between side edges of the respective adjacent cover panels when said tank cover is open, and to fall by gravity into such grain storage tank when said tank cover is closed.

10. A grain storage tank cover as in claim 9, said plurality of tank cover panels comprising first and second opposing primary cover panels, and third and fourth opposing support cover panels, oriented generally perpendicular to the first and second primary cover panels when said support cover panels are erected, and adapted for pivoting attachment to such underlying grain storage tank at proximal edges of said cover panels and, when attached to such underlying grain storage tank, each such third and fourth polymeric cover panel being adapted to pivot at such proximal edge of the respective cover panel and thereby to pivot between a closed position covering at least a portion of the top opening, and an open position facilitating access to such grain storage tank from above, each of said flexible fabric transition panels being secured to, and serving as a closure between, one of said primary cover panels and one of said support cover panels.

11. A grain storage tank cover as in claim 10 wherein the compositions of said polymeric cover panels comprise acrylonitrile butadiene styrene copolymer.

12. A grain storage tank cover as in claim 9 wherein said rigid polymeric cover panels comprise double wall construction defining a crossing network of intersecting ribs on corresponding walls of a given said cover panel.

13. A grain storage tank cover as in claim 9, flexible fabric panels comprising composite sheet material, said composite sheet material comprising a fibrous substrate, and an abrasion resistant polymeric coating on said fibrous substrate, said flexible fabric panels having sufficient mass, and being so attached to said cover panels, that when said cover panels are lowered to thereby close the top opening, central portions of said transition panels are pulled by gravity so as to move downwardly into such grain storage tank and away from said rigid cover panels.

14. A grain storage tank cover as in claim 9 wherein said rigid polymeric cover panels comprise double wall construction defining a crossing network of intersecting ribs on corresponding walls of a given said cover panel.

15. A grain storage tank cover for use in combination with an underlying grain storage tank on an agricultural harvesting machine, such grain storage tank having a plurality of walls defining an underlying tank structure, and a top opening to be overlain and closed by said grain storage tank cover, said grain storage tank cover comprising a support structure encompassing a cover opening overlying the top opening in such grain storage tank, the cover opening having an outer perimeter, said grain storage tank cover further comprising a plurality of rigid polymeric cover panels which collectively, along with said support structure overlie and close the cover opening, whereby said plurality of rigid polymeric cover panels form a top surface of said grain storage tank cover over such top opening, and thereby forming a closure over the cover opening of said grain storage tank cover, and thereby over such top opening of such grain storage tank, each said rigid polymeric cover panel having a proximal edge, an opposing distal edge, and side edges, said polymeric cover panels being adapted for pivoting attachment to said support structure at the proximal edge such that each said cover panel, when attached to said support structure, is adapted to pivot at the such proximal edge and thereby to pivot between a closed position covering at least a portion of the cover top opening, and an open position facilitating access to such grain storage tank from above through the cover opening, the plurality of rigid polymeric cover panels, which form portions of the closure of the cover opening, being adapted collectively to close the cover opening, and thus such top opening when pivoted downwardly, and to expose the cover opening, and thus such top opening when pivoted upwardly, said rigid polymeric cover panels which form Portions of the closure, when said cover is closed, forming respective one or more joints therebetween at facing respective edge regions adjacent respective ones of said edges of said cover panels at the top surface of said grain storage tank cover, said edge regions at each said joint collectively defining a rain gutter (88) effective to direct rain water toward the outer perimeter of the cover opening.

16. A grain storage tank cover, for use in combination with an underlying grain storage tank on an agricultural harvesting machine, such grain storage tank having a plurality of walls defining an underlying tank structure, and a top opening to be overlain and closed by said grain storage tank cover, said grain storage tank cover comprising:

(a) at least a first pair of opposing generally rigid polymeric cover panels, adapted for pivoting attachment to such underlying grain storage tank and, when attached to such grain storage tank, each such pair of rigid polymeric cover panels being movable between a closed position covering at least a portion of the top opening, and an open position facilitating access to such grain storage tank from above; and (b) actuator apparatus comprising a single lifting and lowering actuator underlying, and connected to, said rigid polymeric cover panels, and underlying mechanical linkages connecting said single actuator to each of said polymeric cover panels, said single actuator, when mounted to such underlying grain storage tank and in combination with said mechanical linkages being effective, upon actuation of said actuator, to provide all lifting force required to cooperatively lift all of said rigid polymeric cover panels, from a configuration where the cover panels close the top opening, thereby to open said grain storage tank cover.

17. A grain storage tank cover as in claim 16, said single lifting and lowering actuator pushing the cover panels upwardly in pivoting motions about edges of such top opening.

18. A grain storage tank cover as in claim 16, said first pair of rigid polymer cover panels, when said cover is closed, forming a joint therebetween at respective distal edge regions of said cover panels, and cooperatively defining a rain gutter therebetween effective to direct rain water toward side edges of said first pair of rigid polymeric cover panels.

19. A grain storage tank cover as in claim 18, each said cover panel of said pair of cover panels comprising a first layer (94, 102) and a second layer (96, 100) generally spaced from each other and joined together at spaced locations about an area of the respective cover panel.

20. A grain storage tank cover as in claim 16 wherein the composition of said polymeric cover panels comprises acrylonitrile butadiene styrene copolymer.

21. A grain storage tank cover as in claim 16 wherein said rigid polymeric cover panels comprise double wall construction defining a crossing network of intersecting ribs on corresponding walls of a given said cover panel.

22. A grain storage tank cover for use in combination with an underlying grain storage tank on an agricultural harvesting machine, such grain storage tank having a plurality of walls defining an underlying tank structure, and a top opening to be overlain and closed by said grain storage tank cover, said grain storage tank cover comprising:

(a) at least a first pair of opposing generally rigid cover panels, adapted for pivoting attachment to such underlying grain storage tank and, when attached to such grain storage tank, each such pair of rigid cover panels being movable between a closed position covering at least a portion of the top opening, and an open position facilitating access to such grain storage tank from above;

(b) actuator apparatus comprising a lifting and lowering actuator;

(c) mechanical linkages connecting said actuator to said cover panels; and (d) elevator support structure for receiving and supporting a grain elevator, said elevator support structure receiving lifting and lowering forces from said actuator apparatus without such forces passing through portions of said mechanical linkage which terminate adjacent said cover panels.

23. A grain storage tank cover for use in combination with an underlying grain storage tank on an agricultural harvesting machine, such grain storage tank having a plurality of walls defining an underlying tank structure, and a top opening to be overlain and closed by said grain storage tank cover, said grain storage tank cover comprising:

(a) at least a first pair of opposing generally rigid polymeric cover panels, adapted for pivoting attachment to such underlying grain storage tank and, when attached to such grain storage tank, each such pair of rigid polymeric cover panels being movable between a closed position covering at least a portion of the top opening, and an open position facilitating access to such grain storage tank from above; and (b) actuator apparatus comprising a single lifting and lowering actuator underlying, and connected to, said rigid polymeric cover panels, and underlying mechanical linkages connecting said single actuator to each of said polymeric cover panels, said single actuator, when mounted to such underlying grain storage tank and in combination with said mechanical linkages being effective, upon actuation of said actuator, to cooperatively lift all of said rigid polymeric cover panels, thereby to open said grain storage tank cover, said grain storage tank cover comprising flexible fabric transition panels, each mounted to respective adjacent ones of said rigid cover panels proximate side edges of said rigid cover panels, so as to bridge, and thereby close, any open space between side edges of the respective adjacent cover panels when said tank cover is open.

24. A grain storage tank cover as in claim 23, said first pair of rigid tank cover panels comprising first and second opposing primary cover panels, said grain storage tank cover further comprising third and fourth opposing support cover panels, oriented generally perpendicular to the first and second primary cover panels when said support cover panels are erected, and adapted for pivoting attachment to such underlying grain storage tank at proximal edges thereof and, when attached to such underlying grain storage tank, each such third and fourth polymeric cover panel being adapted to pivot at such proximal edge and thereby to pivot between a closed position covering at least a portion of the top opening, and an open position facilitating access to such grain storage tank from above, each of said flexible fabric transition panels being secured to, and serving as a closure between, one of said primary cover panels and one of said support cover panels.

25. A grain storage tank cover as in claim 24 wherein the composition of said polymeric cover panels comprises acrylonitrile butadiene styrene copolymer.

26. A grain storage tank cover as in claim 25 wherein said rigid polymeric cover panels comprise double wall construction defining a crossing network of intersecting ribs on corresponding walls of a given said cover panel.

27. A grain storage tank cover as in claim 23, said flexible fabric transition panels comprising composite sheet material, said composite sheet material comprising a fibrous substrate, and an abrasion resistant polymeric coating on said fibrous substrate, said flexible fabric transition panels having sufficient mass, and being so attached to said cover panels, that when said cover panels are lowered to thereby close the top opening, central portions of said transition panels are pulled by gravity so as to move downwardly into such grain storage tank and away from said rigid cover panels.

28. A grain storage tank cover, for use in combination with an underlying grain storage tank on an agricultural harvesting machine, such grain storage tank having a plurality of walls defining an underlying tank structure, and a top opening to be overlain and closed by said grain storage tank cover, said grain storage tank cover comprising:

(a) at least first and second opposing generally rigid cover panels, each having a proximal edge, an opposing distal edge, and side edges, said cover panels being adapted for pivoting attachment to such underlying grain storage tank at the proximal edges and, when so attached to such grain storage tank for pivoting thereabout, each such rigid cover panel being movable between a closed position covering at least a portion of the top opening, and an open position facilitating access to such grain storage tank from above; and (b) flexible fabric transition panels, each mounted to respective adjacent ones of said generally rigid cover panels proximate the side edges of said cover panels, so as to bridge, and thereby close, any open spaces between respective adjacent ones of the side edges of the respective adjacent cover panels when said tank cover is open, and wherein central portions of said transition panels fall by gravity into such grain storage tank when said tank cover is closed.

29. A grain storage tank cover as in claim 28, said first and second generally rigid cover panels comprising primary cover panels, said tank cover further comprising third and fourth opposing generally rigid support cover panels, oriented generally perpendicular to the first and second cover panels when said support cover panels are erected and adapted for pivoting attachment to such underlying grain storage tank and, when attached to such grain storage tank, each such third and fourth support cover panel being movable between a closed position covering at least a portion of the top opening, and an open position facilitating access to such grain storage tank from above, each of said flexible fabric transition panels being secured to, and serving as a closure between, one of said primary panels and one of said support panels.

30. A grain storage tank cover as in claim 28 wherein the composition of said rigid cover panels comprises acrylonitrile butadiene styrene copolymer.

31. A grain storage tank cover as in claim 28 wherein said rigid cover panels comprise double wall construction defining a crossing network of intersecting ribs on corresponding walls of a given said cover panel.

32. A grain storage tank cover as in claim 28, said flexible fabric panels comprising composite sheet material, said composite sheet material comprising a fibrous substrate, and an abrasion resistant polymeric coating on said fibrous substrate, said flexible fabric panels having sufficient mass, and being so attached to said cover panels, that when said cover panels are lowered to thereby close the top opening, said cover panels are pulled by gravity so as to move downwardly into such grain storage tank and away from said cover panels.

33. A grain storage tank cover as in claim 28, including a single actuator underlying said rigid cover panels, and underlying mechanical linkages connecting said single actuator to each of said rigid cover panels, said single actuator, when mounted to such underlying grain storage tank and in combination with said mechanical linkages, being effective, upon actuation of said actuator, to provide all lifting force required to cooperatively lift or lower all of said rigid cover panels, from a configuration where the cover panels close the top opening, thereby to open or close said grain storage tank cover.

34. A grain storage tank cover as in claim 33, said mechanical linkages including elevator mounting structure for mounting a grain elevator, delivering grain to such grain storage tank, to said mechanical linkages such that, when said actuator is activated to open or close said cover panels, an elevator mounted to said elevator mounting structure is cooperatively raised or lowered in such underlying grain storage tank.

35. A grain storage tank cover as in claim 28, said first and second rigid cover panels, when said cover is closed, forming a joint therebetween at respective distal edge regions of said first and second cover panels, and cooperatively defining a rain gutter (88) therebetween effective to direct rain water toward the side edges of said first and second rigid cover panels.

* * * * *